Oct. 27, 1953     M. HOLLIS     2,656,918
SPECTACLES DISPLAY CARD
Filed March 29, 1951
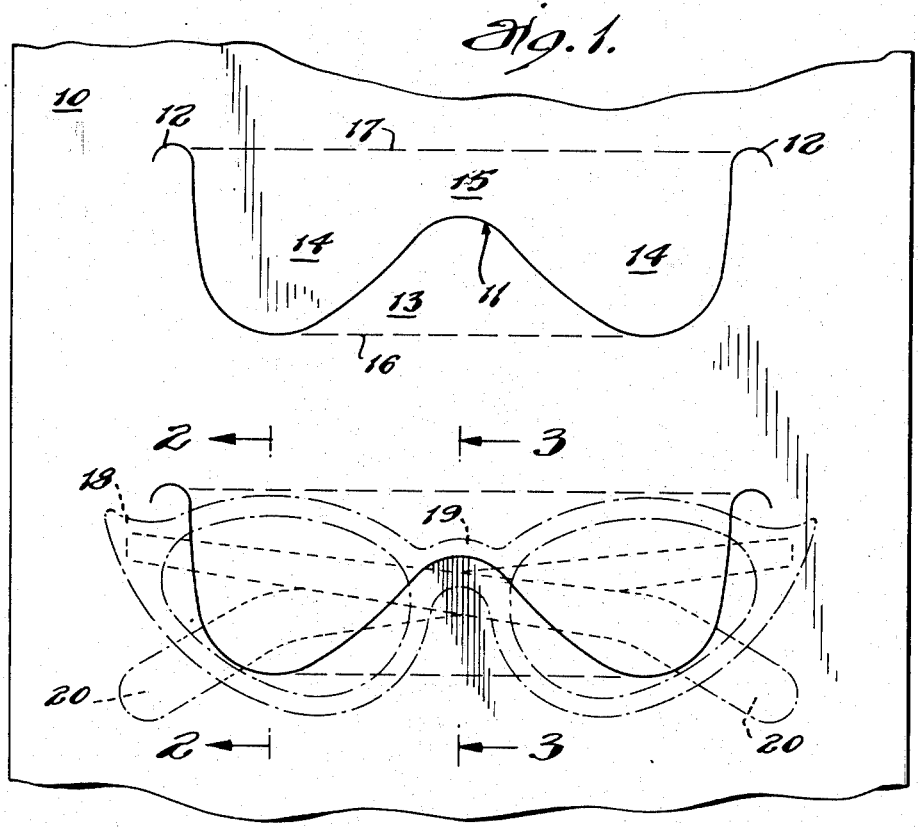
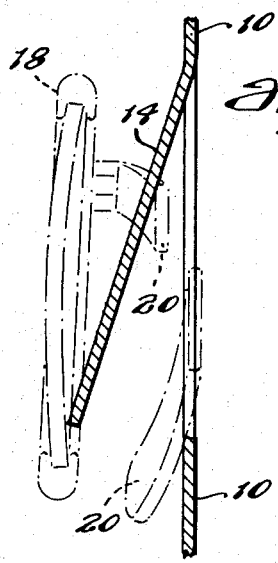
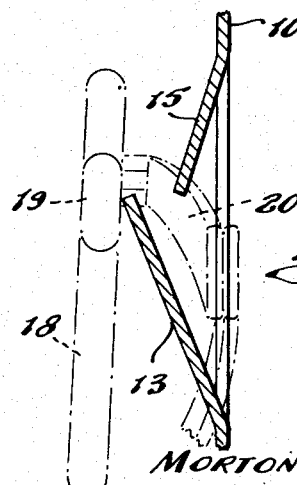
INVENTOR.
MORTON HOLLIS
BY
ATTORNEY Patented Oct. 27, 1953

2,656,918

UNITED STATES PATENT OFFICE 2,656,918

SPECTACLES DISPLAY CARD

Morton Hollis, Newton, Mass., assignor to Foster Grant Co., Inc., Leominster, Mass., a corporation of Massachusetts Application March 29, 1951, Serial No. 218,183

1 Claim. (Cl. 206—79)

This invention relates to a spectacles display card and more particularly to a card on which sunglasses and the like may be mounted for display and sale.

The principal objects of the invention are to provide a card of this type that is very simple and inexpensive to manufacture; upon which the glasses may be easily mounted for display; and from which they can be readily detached when desired.

A preferred form of my display card is illustrated in the accompanying drawings, in which:

Fig. 1 is a fragmentary front view of a display card showing a pair of spectacles mounted thereon, the spectacles being outlined in dot and dash lines in position as mounted on the card;

Fig. 2 is a cross-sectional view, on an enlarged scale, taken on the line 2—2 of Fig. 1.

Fig. 3 is a cross-sectional view on a like scale, taken on the line 3—3 of Fig. 1.

The card consists of a flat piece 10 of cardboard or other suitable material of any desired size or shape upon which a plurality of spectacles or sunglasses may be conveniently mounted.

Slits 11 are formed in the card, each of which preferably terminates in a curved extension 12 that serves to prevent tearing when the fingers 13 and 14 are bent forward, as in Figs. 2 and 3.

Each slit 11 may be in the form of a sinuous curve, as shown in Fig. 1, or any other suitable form so as to provide a lower upwardly directed finger 13, and two upper downwardly directed fingers 14—14 which latter fingers are connected by a central portion 15. The finger 13 intervenes the two fingers 14. In the present instance the fingers are complementary in shape to avoid waste in cutting, but such shape is not essential. The card may be scored along the lines 16 and 17 to facilitate bending of the fingers as required for mounting the glasses on the card.

The glasses 18 are mounted on the card with their temples 20 folded to cross at a point behind the bridge 19 of the frame. In mounting the glasses, the fingers 14 are each inserted downwardly between an end of a temple and an end portion of the frame, while the finger 13 is inserted upwardly between the temples and the bridge of the frame in the vicinity where the temples cross. The connecting portion 15 between the fingers 14 extends partly over the temples. In this manner the spectacles can be easily and quickly mounted on the card and securely held in place thereon.

While I have illustrated and described a preferred form of my display card, it is to be understood that modifications in its construction may be made within the scope of the invention.

What I claim is:

In combination, a display card and a pair of spectacles mounted for display thereon with no portion of the card covering any portion of the front of the frame of the spectacles, said card having two downwardly projecting fingers and a single intervening upwardly projecting finger, said spectacles having its temples folded to cross each other and being mounted and held on the card with the downwardly projecting fingers of the latter inserted and engaged between the temples and the rear face of the spectacle frame, and with the upwardly extending finger inserted and engaged between the rear face of the bridge portion of the frame and the temples substantially at the point where they cross.

MORTON HOLLIS.

References Cited in the file of this patent

UNITED STATES PATENTS

| Number | Name | Date |
|---|---|---|
| 1,284,407 | Marzahl | Nov. 12, 1918 |
| 1,952,071 | Hunter | Mar. 27, 1934 |
| 2,530,542 | Sawyer | Nov. 21, 1950 |

FOREIGN PATENTS

| Number | Country | Date |
|---|---|---|
| 471,746 | Great Britain | Sept. 9, 1937 |